(12) United States Patent
Hirano et al.

(10) Patent No.: US 10,069,396 B2
(45) Date of Patent: Sep. 4, 2018

(54) ELECTRICAL POWER SYSTEM

(71) Applicant: TOYOTA JIDOSHA KABUSHIKI KAISHA, Toyota-shi, Aichi-ken (JP)

(72) Inventors: Kosuke Hirano, Toyota (JP); Masaki Okamura, Toyota (JP); Toshifumi Yamakawa, Okazaki (JP); Jun Fujita, Tokai (JP); Ryo Kamikawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/837,474

(22) Filed: Dec. 11, 2017

(65) Prior Publication Data

US 2018/0166967 A1 Jun. 14, 2018

(30) Foreign Application Priority Data

Dec. 13, 2016 (JP) ................................ 2016-241127

(51) Int. Cl.
*H02M 7/68* (2006.01)
*H02M 1/00* (2006.01)
*H02M 3/158* (2006.01)
*H02M 7/42* (2006.01)
*B60L 11/18* (2006.01)

(52) U.S. Cl.
CPC ............. *H02M 1/00* (2013.01); *H02M 3/158* (2013.01); *H02M 7/42* (2013.01); *B60L 11/1803* (2013.01); *H02M 2001/0054* (2013.01)

(58) Field of Classification Search
CPC ....... H02M 3/1584; H02M 2003/1586; H02M 7/42; H02M 2001/0054; H02J 3/383; B60L 11/1816
USPC .......... 363/16–17, 21.02, 65, 71, 89, 95, 97; 307/64, 66, 82, 104
See application file for complete search history.

(56) References Cited

U.S. PATENT DOCUMENTS

| 8,884,564 B2 | 11/2014 | Itoh et al. | |
|---|---|---|---|
| 8,907,647 B2 * | 12/2014 | Nakagawa | H02M 7/53871 323/222 |
| 9,705,416 B2 * | 7/2017 | Figge | H02M 3/337 |

(Continued)

FOREIGN PATENT DOCUMENTS

| JP | 2011-114918 A | 6/2011 |
|---|---|---|
| JP | 2012-210138 A | 10/2012 |

*Primary Examiner* — Rajnikant Patel
(74) *Attorney, Agent, or Firm* — Hunton Andrews Kurth LLP

(57) ABSTRACT

A power system has a first control apparatus configured to generating a first command signal and a second command signal, to control the first converter on the basis of the first command signal, and to transmit the second command signal to a second control apparatus and the second control apparatus configured to control the second converter on the basis of the received second command signal. When it is requested that a state of each of the first and second converters is changed from a first state to a second state, the first control apparatus generates the first and second command signals so that the state of the second converter is changed to a third state in which both of the upper arm and the lower arm keep being in the OFF state, then the state of the first converter is changed from the first state to the second state, and then the state of the second converter is changed from the third state to the second state.

3 Claims, 9 Drawing Sheets

(56) References Cited

U.S. PATENT DOCUMENTS

| | | | | |
|---|---|---|---|---|
| 2010/0019723 A1* | 1/2010 | Ichikawa | ............... | B60L 11/123 320/109 |
| 2012/0013182 A1* | 1/2012 | Minegishi | ............... | B60K 6/365 307/9.1 |
| 2012/0229061 A1* | 9/2012 | Itoh | ..................... | B60L 3/003 318/400.3 |
| 2013/0076135 A1* | 3/2013 | Zhu | ..................... | H02M 3/1584 307/43 |

* cited by examiner

[FIG. 1]
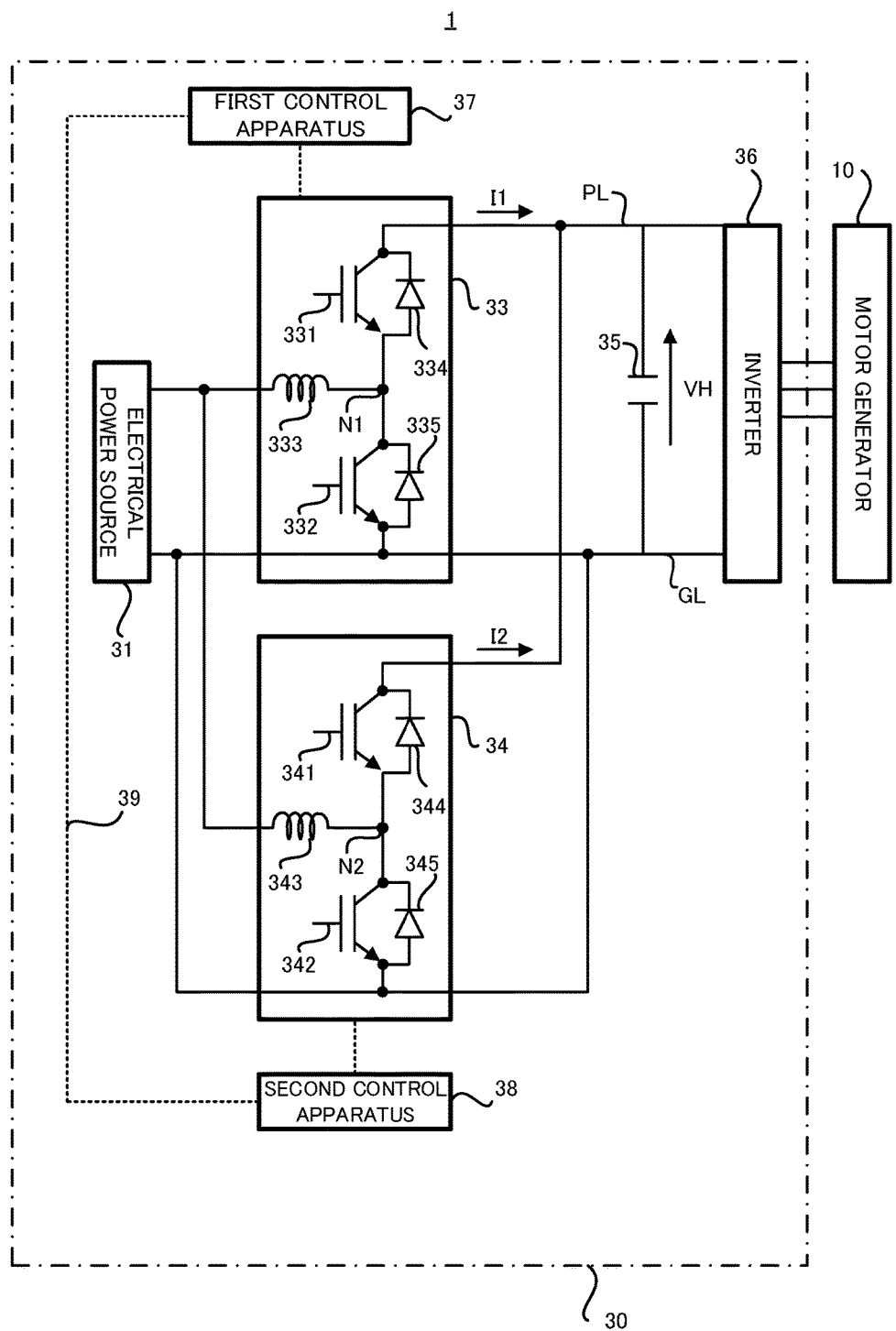

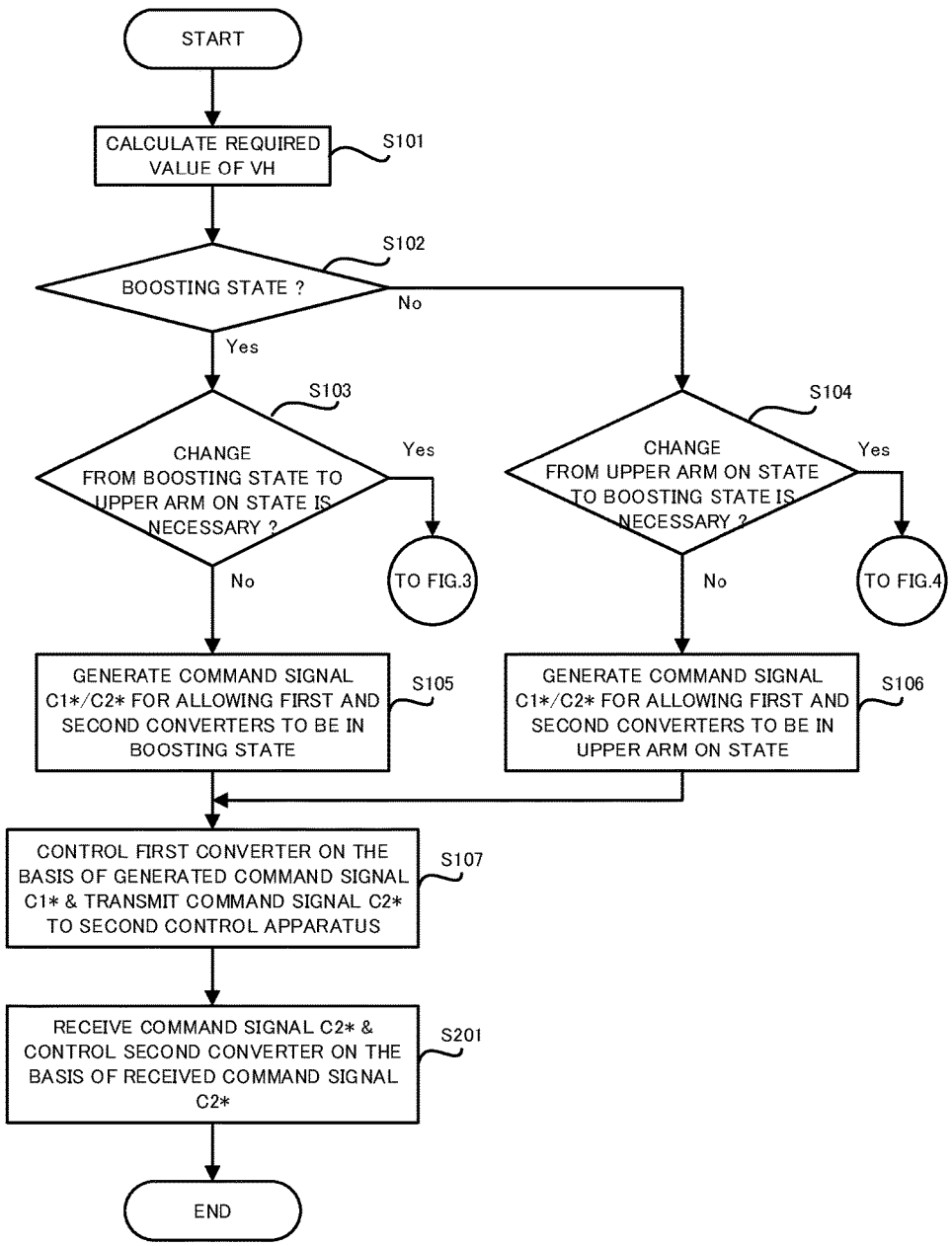
[FIG. 2]

[FIG. 3]
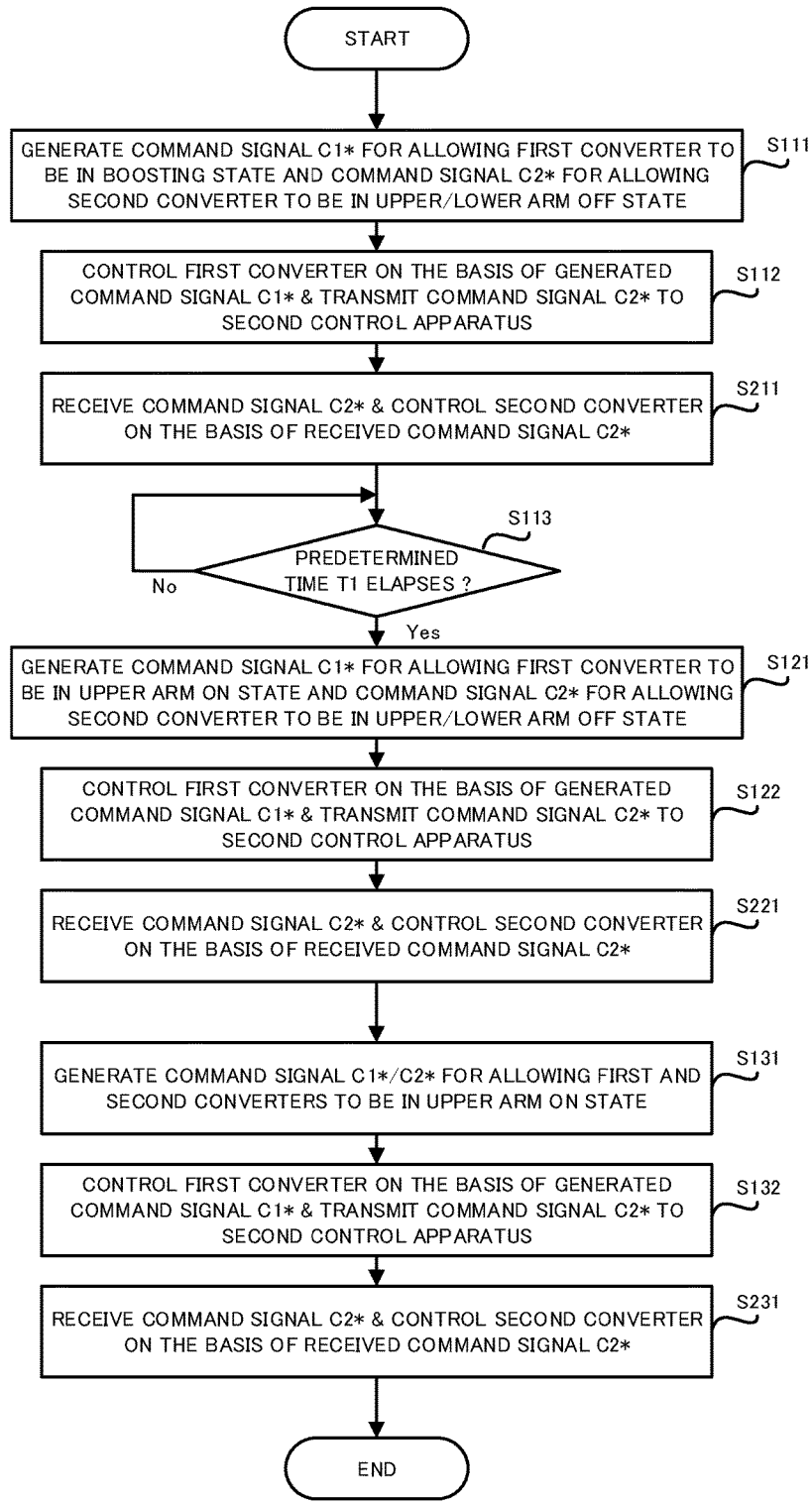

[FIG. 4]
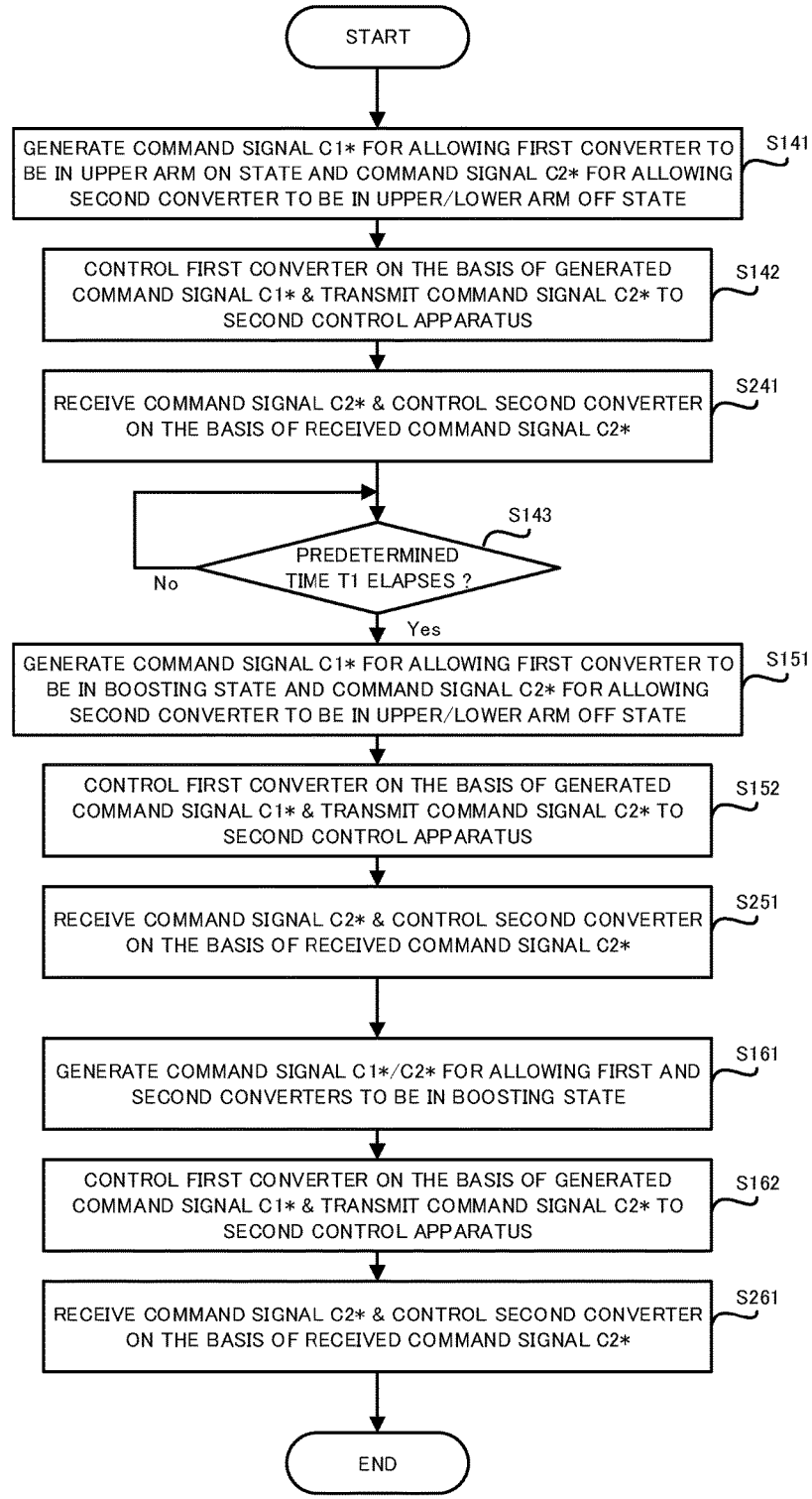

[FIG. 5]
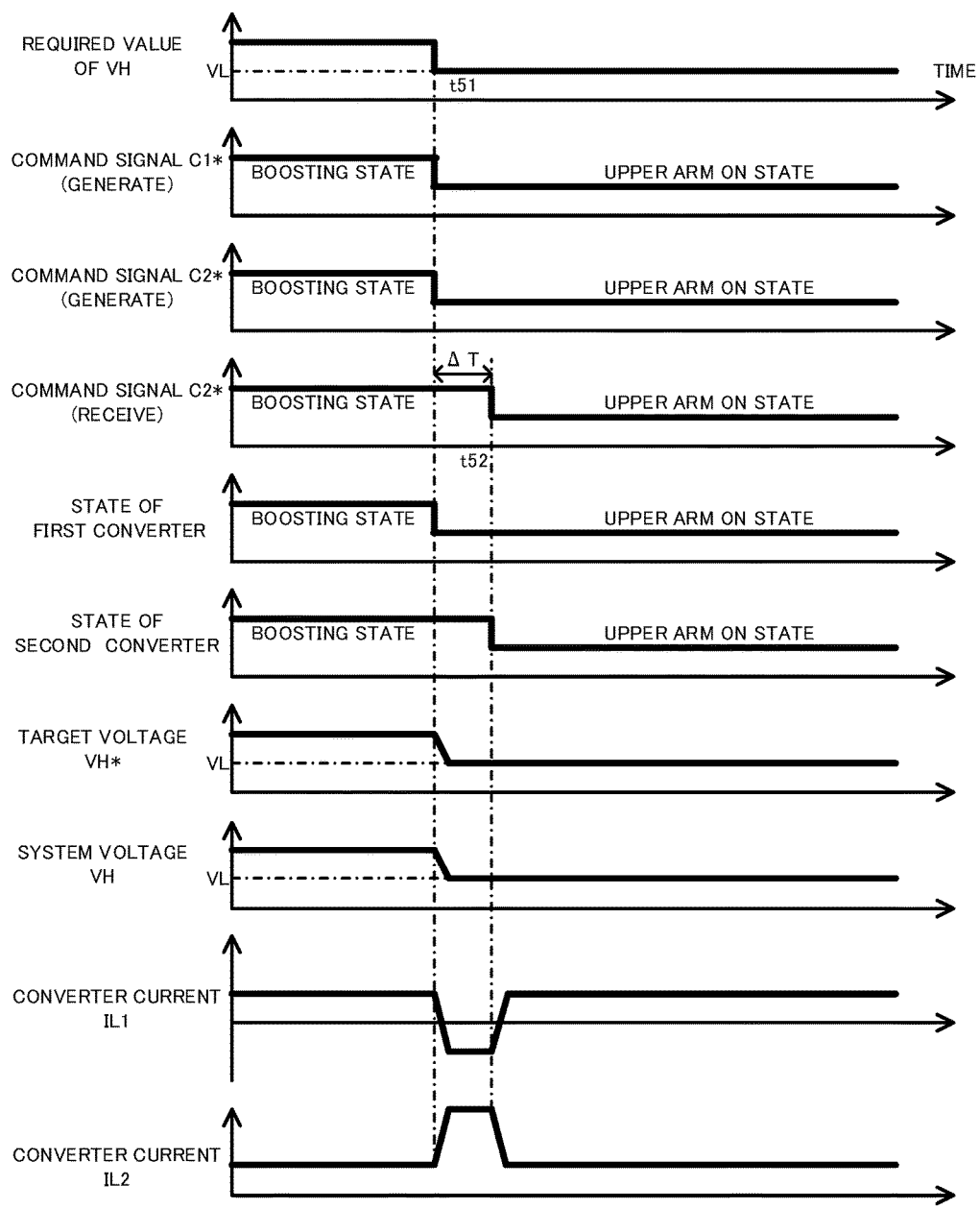

[FIG. 6]
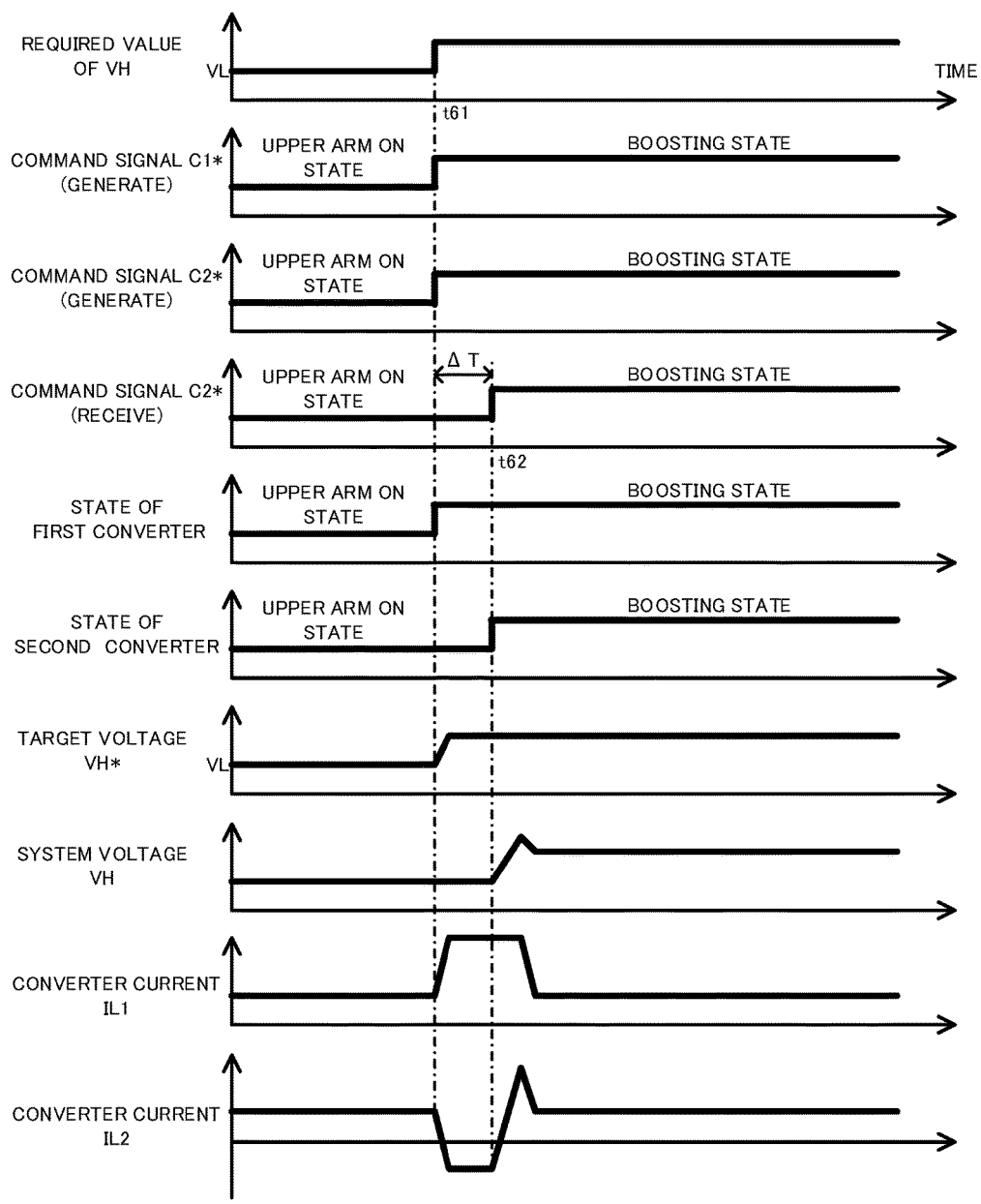

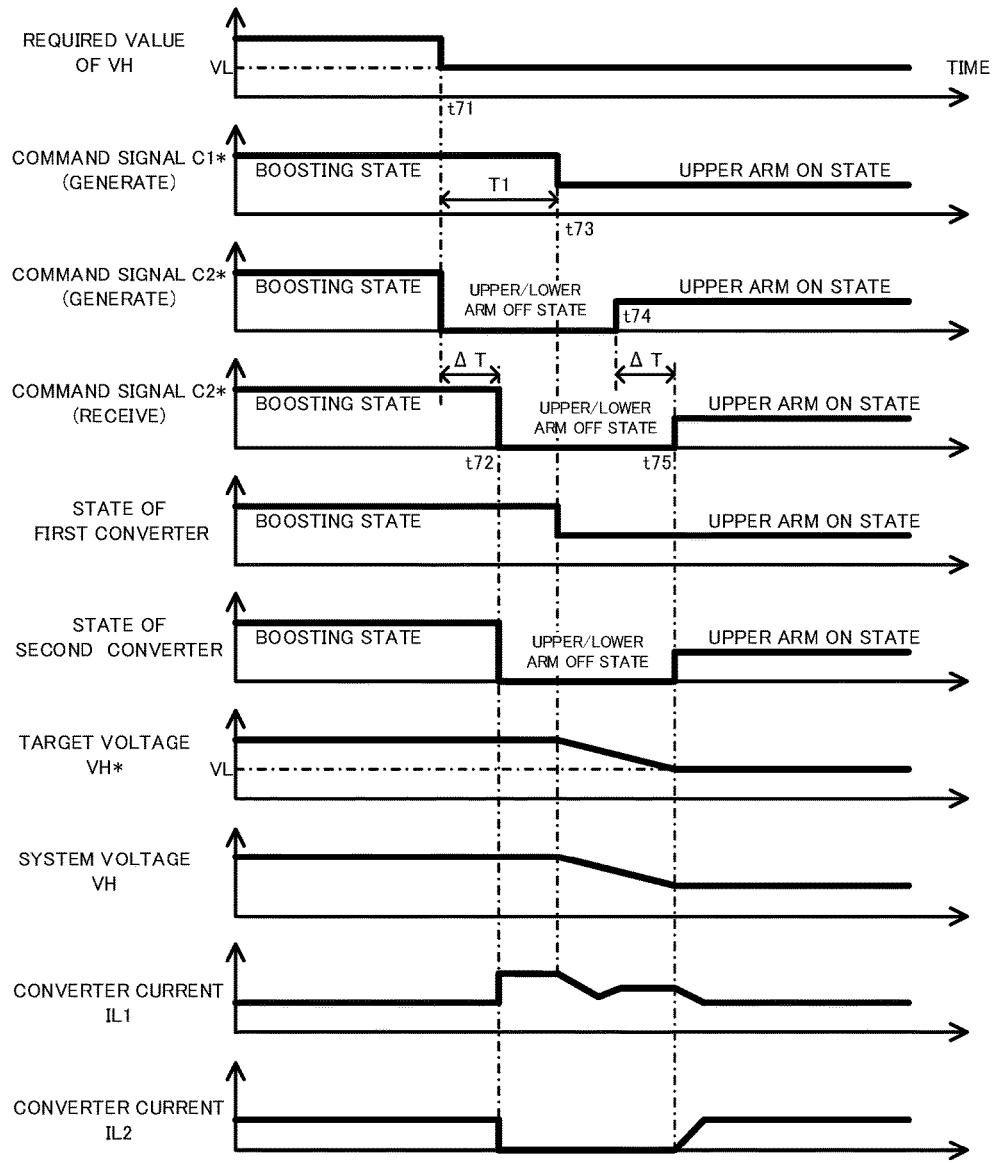
[FIG. 7]

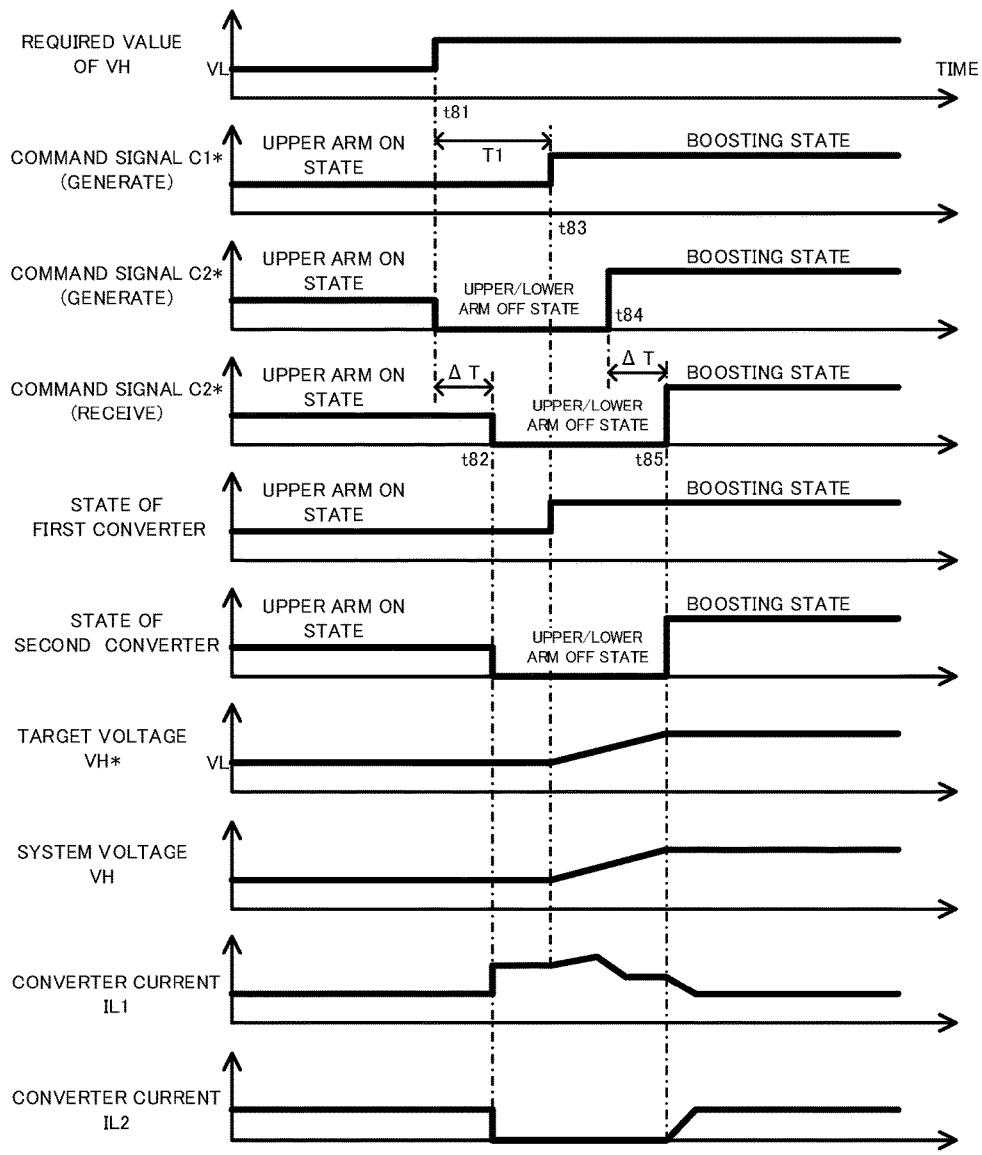

[FIG. 9]
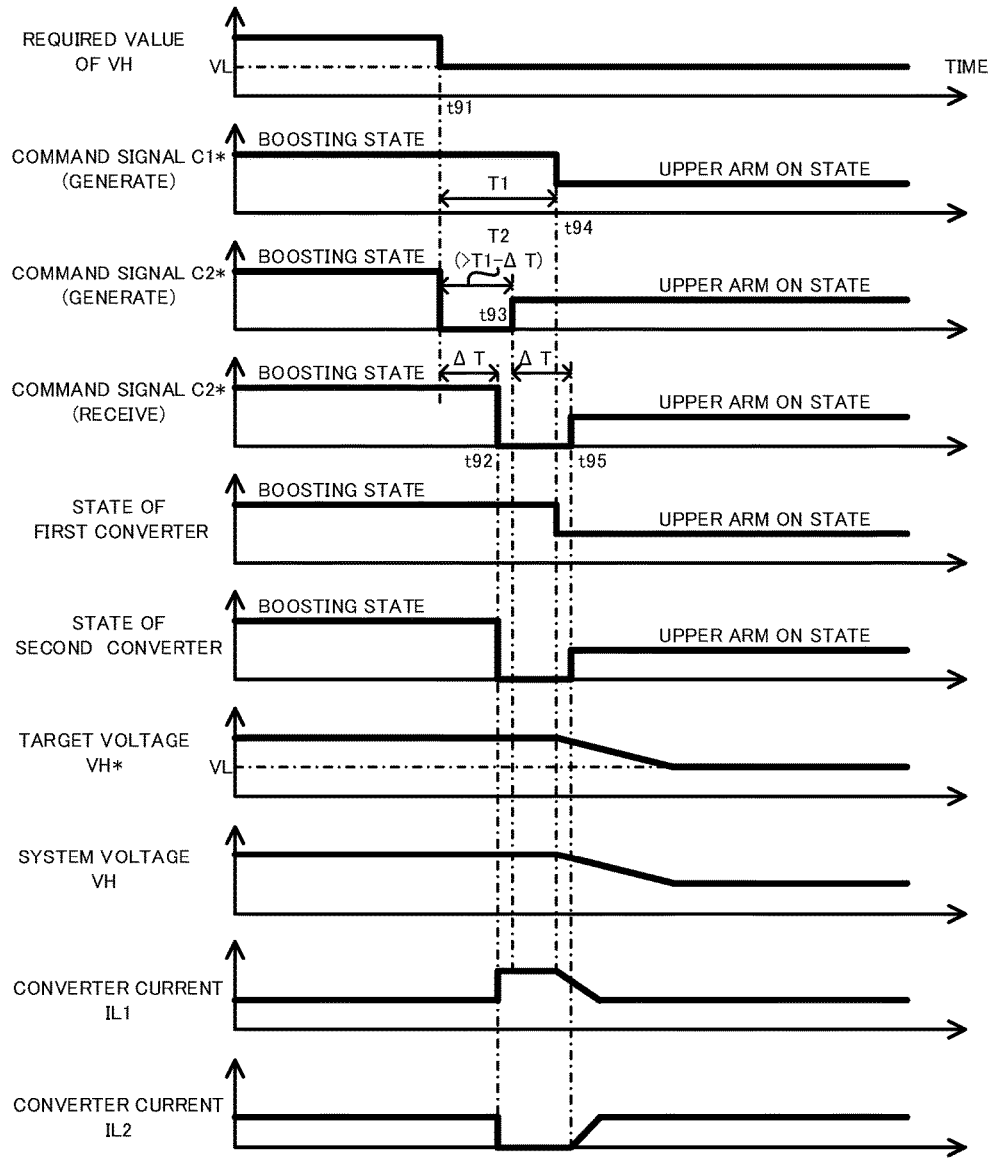

ELECTRICAL POWER SYSTEM

CROSS-REFERENCE TO RELATED APPLICATION

The present application claims priority to Japanese Patent Application No. 2016-241127 filed on Dec. 13, 2016, which is incorporated herein by reference in its entirety.

TECHNICAL FIELD

The present invention relates to a technical field of an electrical power system that has: a plurality of converters; and a plurality of control apparatuses that are configured to control the plurality of converters, respectively, for example.

BACKGROUND ART

Each of a Patent Literature 1 and a Patent Literature 2 discloses an electrical power system that has an electrical power source; a load; a plurality of converters that are electrically connected in parallel between the electrical power source and the load; and a plurality of control apparatuses (these correspond to controlling units in the Patent Literature 1 or driving circuits in the Patent Literature 2) that are configured to control the plurality of converters, respectively. Each of the plurality of converters includes a plurality of switching elements each of which is referred to as an upper arm or a lower arm. Each of the plurality of converters is configured to switch the upper arm and the lower arm in a complementary manner (namely, to repeatedly turn on and then turn off the upper arm and the lower arm alternately) to boost electrical voltage outputted from the electrical power source and then output the boosted electrical voltage to the load.

CITATION LIST

Patent Literature

[Patent Literature 1] Japanese Unexamined Patent Application Publication No. 2011-114918
[Patent Literature 2] Japanese Unexamined Patent Application Publication No. 2012-210138

SUMMARY OF INVENTION

Technical Problem

The switching of the upper arm and the lower arm causes switching loss. In order to reduce the switching loss, the state of the converter may be changed to an upper arm ON state in which the upper arm keeps being in an ON state and the lower arm keeps being in an OFF state. In this case, the electrical power source is electrically connected to the load through the upper arm that keeps being in the ON state. Moreover, the switching loss is reduced, because each of the upper arm and the lower arm is not switched. However, when the converter in the upper arm ON state is not capable of boosting the electrical voltage outputted from the electrical power source. Thus, the state of the converter is changed to a boosting state in which the upper arm and the lower arm are switched in a complementary manner when it is required for the converter to boost the electrical voltage outputted from the electrical power source, and the state of the converter is changed to the upper arm ON state when it is not required for the converter to boost the electrical voltage outputted from the electrical power source.

By the way, in the Patent Literatures 1 and 2, the plurality of control apparatuses are configured to generate a plurality of command signals, respectively, wherein the plurality of command signals are used to control the plurality of converters, respectively. Namely, a first control apparatus of the plurality of control apparatuses is configured to generate a first command signal for controlling a first converter of the plurality of converters, and a second control apparatus of the plurality of control apparatuses is configured to generate a second command signal for controlling a second converter of the plurality of converters. On the other hand, inventors of the present invention develops a technique in which the first control apparatus is configured to generate both of the first and second command signals. In this case, the first control apparatus is configured to control the first converter on the basis of the generated first command signal and to transmit the generated second command signal to the second control apparatus through a communication line. The second control apparatus is configured to receive the second command signal and then to control the second converter on the basis of the received second command signal.

In this case, a time period (a time interval) between a timing at which the first control apparatus generates the second command signal and a timing at which the second control apparatus starts to control the second converter on the basis of the generated second command signal is longer than a time period between a timing at which the first control apparatus generates the first command signal and a timing at which the first control apparatus starts to control the first converter on the basis of the generated first command signal. This is because a delay occurs when the second control apparatus controls the second converter on the basis of the second command signal, compared to the case where the first control apparatus controls the first converter on the basis of the first command signal. The delay includes a first delay corresponding to a time period that is required for the first control apparatus to transmit the second command signal generated by the first control apparatus to the second control apparatus and a second delay corresponding to a time period required for the second control apparatus to receive the transmitted second command signal and then to actually start to control the second converter on the basis of the received second command signal. If this delay occurs, there is a possibility that undesired large electrical current flows from the first converter to the second converter or from the second converter to the first converter when the state of each of the first and second converters is changed from the upper arm ON state to the boosting state or from the boosting state to the upper arm ON state, which is a technical problem.

Specifically, an example in which the state of each of the first and second converters is changed from the upper arm ON state to the boosting state will be described below. In this case, the first control apparatus generates the first and second command signals for simultaneously changing the state of each of the first and second converters from the upper arm ON state to the boosting state. However, due to the above described delay, a timing at which the state of the second converter is changed from the upper arm ON state to the boosting state on the basis of the second command signal is delayed with respect to a timing at which the state of the first converter is changed from the upper arm ON state to the boosting state on the basis of the first command signal. As a result, a time period when the second converter is in the upper arm ON state although the first converter is in the boosting state exists. In this time period, the electrical voltage that is outputted to the load is not boosted, because the second converter tries to output the electrical voltage outputted from the electrical power source to the load without boosting the electrical voltage while the first converter tries to output the electrical voltage outputted from the electrical power source to the load after boosting the electrical voltage. Thus, if the first converter keeps to perform an operation for boosting the electrical voltage outputted to the load, the first converter tries to boost the electrical voltage outputted to the load by allowing the relatively large electrical current to flow. However, the relatively large electrical current flows from the first converter to the second converter. As a result, the relatively large electrical current flows through the first and second converters. Thus, there is a possibility that characteristics of each of the first and second converters relating to resistance to heat deteriorates.

Note that if the load is configured to generate the electrical power (for example, the load is the electrical power generator), the plurality of converters are allowed to switch the upper arm and the lower arm in a complementary manner to step down the electrical voltage generated by the load and then output the stepped-down electrical voltage to the electrical power source (namely, charge the electrical power source). Namely, the converter in the boosting state is configured not only to boost the electrical voltage outputted from the electrical power source and then output the boosted electrical power to the load but also to step down the electrical voltage outputted from the load and then output the stepped-down electrical voltage to the electrical power source. Thus, the above described technical problem occurs not only when the converter boosts the electrical voltage outputted from the electrical power source and then output the boosted electrical power to the load but also when the converter steps down the electrical voltage outputted from the load and then output the stepped-down electrical voltage to the electrical power source.

The above described technical problem is one example of the technical problem to be solved by the present invention. It is therefore an object of the present invention to provide, for example, an electrical power system that is configured to appropriately change the state of each of the plurality of converters from a first state in which the upper arm and the lower arm are switched in a complementary manner to a second state in which the upper arm keeps being in the ON state and the lower arm keeps being in the OFF state or from the second state to the first state, while suppressing deterioration of the characteristics of the plurality of converters relating to the resistance to the heat.

Solution to Problem

<1>

One aspect of an electrical power system is an electrical power system that has: a first converter that has an upper arm and a lower arm and that is configured to boost or step down electrical voltage outputted from one of an electrical power source and a load and then to output the boosted or stepped-down electrical voltage to the other one of the electrical power source and the load; a second converter that has an upper arm and a lower arm and that is configured to boost or step down electrical voltage outputted from one of the electrical power source and the load and then to output the boosted or stepped-down electrical voltage to the other one of the electrical power source and the load; a first control apparatus that is configured to generate a first command signal and a second command signal, to control the upper arm and the lower arm of the first converter on the basis of the first command signal, and to transmit the second command signal to a second control apparatus through a communication line; and the second control apparatus that is configured to receive the second command signal transmitted from the first control apparatus, and to control the upper arm and the lower arm of the second converter on the basis of the received second command signal, wherein when it is requested that a state of each of the first and second converters in a first state in which the upper arm and the lower arm are switched alternately in a complementary manner is changed to a second state in which the upper arm keeps being in an ON state and the lower arm keeps being in an OFF state or it is requested that the state of each of the first and second converters in the second state is changed to the first state, the first control apparatus is configured to generate the first and second command signals so that (i) the state of the second converter is changed from the first or second state to a third state in which both of the upper arm and the lower arm keep being in the OFF state, then (ii) the state of the first converter is changed from the first state to the second state or from the second state to the first state after the state of the second converter is changed to the third state, and then (iii) the state of the second converter is changed from the third state to the second or first state after the state of the first converter is changed from the first state to the second state or from the second state to the first state.

According to one aspect of the electrical power system, one of the first and second converters is not in the first state when the other one of the first and second converters is in the second state. Thus, relatively large electrical current does not flow from one of the first and second converters to the other one of the first and second converters when the state of each of the first and second converters is changed. Therefore, one aspect of the electrical power system is capable of appropriately changing the state of each of the plurality of converters from the first state to the second state or from the second state to the first state while suppressing deterioration of the characteristics of the plurality of converters relating to the resistance to the heat.

<2>

In another aspect of the above described one aspect of the electrical power system, the first control apparatus is configured to generate the first command signal that requests the first converter to keep being in the first or second state until a first predetermined time elapses after generating the second command signal that requests a start of changing the state of the second converter to the third state, the first control apparatus is configured to generate the first command signal that requests a change of state of the first converter from the first state to the second state or from the second state to the first state after the first predetermined time elapses after generating the second command signal that requests the start of changing the state of the second converter to the third state, the first predetermined time is equal to or longer than a delay time that is required for the second control apparatus to start to control the second converter on the basis of the generated second command signal after the first control apparatus generates the second command signal.

According to this aspect, the first control apparatus is capable of appropriately generating the first command signal that allows the state of the first converter to be changed from the first state to the second state or from the second state to the first state after the state of the second converter is changed from the first or second state to the third state.

<3>

In another aspect of the above described one aspect of the electrical power system, the first control apparatus is configured to generate the second command signal that requests the change of the state of the second converter from the third state to the second or first state after a second predetermined time elapses after generating the second command signal that requests the start of changing the state of the second converter to the third state, the second predetermined time is longer than a difference between the first predetermined time and the delay time.

According to this aspect, the first control apparatus is capable of appropriately generating the second command signal that allows the state of the second converter to be changed from the third state to the first or second state after the state of the first converter is changed from the first state to the second state or from the second state to the first state.

The operation and other advantages in the present invention will become more apparent from the embodiments explained below. The object and advantages of the present invention will be realized and attained by means of the elements and combinations particularly pointed out in the claims. It is to be understood that both the foregoing general description and the following detailed description are exemplary and explanatory and are not restrictive of the embodiment, as claimed.

BRIEF DESCRIPTION OF DRAWINGS

FIG. 1 is a block diagram that illustrates one example of an entire structure of a vehicle of the present embodiment.

FIG. 2 is a flowchart that illustrates a flow of an entire operation for controlling first and second converters.

FIG. 3 is a flowchart that illustrates a flow of an operation for changing a state of each of the first and second converter from a boosting state to an upper arm ON state.

FIG. 4 is a flowchart that illustrates a flow of an operation for changing the state of each of the first and second converter from the upper arm ON state to the boosting state.

FIG. 5 is a timing chart that illustrates temporal transition of the state of an electrical power system in a comparison example, when the electrical power system in the comparison example changes the state of each of the first and second converter from the boosting state to the upper arm ON state.

FIG. 6 is a timing chart that illustrates temporal transition of the state of the electrical power system in the comparison example, when the electrical power system in the comparison example changes the state of each of the first and second converter from the upper arm ON state to the boosting state.

FIG. 7 is a timing chart that illustrates temporal transition of the state of an electrical power system in a present embodiment, when the electrical power system in the present embodiment changes the state of each of the first and second converter from the boosting state to the upper arm ON state.

FIG. 8 is a timing chart that illustrates temporal transition of the state of the electrical power system in present embodiment, when the electrical power system in present embodiment changes the state of each of the first and second converter from the upper arm ON state to the boosting state.

FIG. 9 is a timing chart that illustrates temporal transition of the state of the electrical power system in present embodiment, when the electrical power system in present embodiment changes the state of each of the first and second converter from the upper arm ON state to the boosting state.

DESCRIPTION OF EMBODIMENTS

Hereinafter, an embodiment of the electrical power system of the present invention will be explained. Note that, in the following description, a vehicle 1 to which the embodiment of the electrical power system of the present invention is adapted will be explained. However, the electrical power system of the present invention and its embodiment may be adapted to any apparatus that is different from the vehicle 1.

(1) Structure of Vehicle 1

With reference to a block diagram illustrated in FIG. 1, the structure of the vehicle 1 in the present embodiment will be explained. As illustrated in FIG. 1, the vehicle 1 has: a motor generator 10 that is one example of the "load" and the electrical power system 30. Note that FIG. 1 illustrates, as one example of the vehicle, the vehicle 1 that has one motor generator 10. However, the vehicle 1 may have two or more motor generators 10. Furthermore, the vehicle 1 may have an engine in addition to the motor generator 10.

The motor generator 10 is configured to operate by using an electrical power that is outputted from the electrical power system 30, when the vehicle 1 is in a power running state. Thus, the motor generator 10 is configured to serve as a motor for supplying a driving power that is used by the vehicle 1 to move. Moreover, the motor generator 10 is configured to serve as a generator for charging an electrical power source 31 of the electrical power system 30, when the vehicle 1 is in a regeneration state.

The electrical power system 30 is configured to output to the motor generator 10 the electrical power that is used by the motor generator 10 to serve as the motor, when the vehicle 1 is in the power running state. Furthermore, the electrical power that is generated by the motor generator 10 serving as the generator is inputted from the motor generator 10 to the electrical power system 30, when the vehicle 1 is in the regeneration state.

The electrical power system 30 has: the electrical power source 31, a first converter 33, a second converter 34, a smoothing condenser 35, an inverter 36, a first control apparatus 37 and a second control apparatus 38.

The electrical power source 31 is an apparatus that is configured to output the electrical power (namely, discharging). The electrical power source 31 is an apparatus to which the electrical power can be inputted (namely, that can be charged). The electrical power source 31 may include a battery that includes at least one of a lead battery, a lithium-ion battery, a nickel-hydrogen battery, a fuel battery and the like. The electrical power source 31 may include a capacitor that includes at least one of a lithium-ion capacitor, an electrical double layer capacitor and the like.

The first converter 33 is configured to boost electrical voltage of the DC (Direct Current) electrical power outputted from the electrical power source 31 and to output the boosted electrical power to the motor generator 10 through the inverter 36, under the control of the first control apparatus 37. Moreover, the first converter 33 is configured to step down electrical voltage of the DC electrical power outputted from the motor generator 10 through the inverter 36 and to output the stepped-down electrical power to the electrical power source 31, under the control of the first control apparatus 37. The second converter 34 is configured to boost electrical voltage of the DC electrical power outputted from the electrical power source 31 and to output the boosted electrical power to the motor generator 10 through the inverter 36, under the control of the second control apparatus 38. Moreover, the second converter 34 is configured to step down electrical voltage of the DC electrical power outputted from the motor generator 10 through the inverter 36 and output the stepped-down electrical power to the electrical power source 31, under the control of the second control apparatus 38. The first converter 33 and the second converter 34 are electrically connected in parallel between the electrical power source 31 and the motor generator 10.

In order to boost and step down (namely, convert) the electrical voltage, the first converter 33 has: an upper arm element 331 that is one example of the "upper arm"; a lower arm element 332 that is one example of the "lower arm"; a reactor 333; a diode 334; and a diode 335. Each of the upper arm element 331 and the lower arm element 332 is a switching element such as a transistor. Each of the upper arm element 331 and the lower arm element 332 is configured to be switched on the basis of command signal C1* that is outputted from the first control apparatus 37. Namely, state of each of the upper arm element 331 and the lower arm element 332 is changed from an ON state to an OFF state or from the OFF state to the ON state on the basis of the command signal C1*. Alternatively, each of the upper arm element 331 and the lower arm element 332 keeps being in the ON state or the OFF state on the basis of the command signal C1*. The upper arm element 331 and the lower arm element 332 are electrically connected in series between a power source line PL and a ground line GL. The reactor 333 is electrically connected between a cathode of the electrical power source 31 and an intermediate node N1, wherein the intermediate node N1 is between the upper arm element 331 and the lower arm element 332. The diodes 334 and 335 are electrically connected in parallel to the upper arm element 331 and the lower arm element 332, respectively, in an inverse-parallel manner.

In order to convert the electrical voltage, the second converter 34 has: an upper arm element 341 that is one example of the "upper arm"; a lower arm element 342 that is one example of the "lower arm"; a reactor 343; a diode 344; and a diode 345. Note that the structure of the second converter 34 is same as the structure of the first converter 33, and thus, the detailed description of the second converter 34 is omitted.

The smoothing condenser 35 is configured to smooth a variation of the electrical voltage between the power source line PL and the ground line GL. In the following description, the electrical voltage between the power source line PL and the ground line GL is referred to as a "system voltage VH". Note that each of the power source line PL and the ground line GL connects the inverter 36 and each of the first converter 33 and the second converter 34.

The inverter 36 is configured to convert the DC electrical power that is outputted from the first converter 33 and the second converter 34 to an AC (Alternate Current) electrical power, when the vehicle 1 is in the power-running state. The inverter 36 is configured to convert the AC electrical power that is generated by the motor generator 10 to the DC electrical power, when the vehicle 1 is in the regeneration state.

The first control apparatus 37 is configured to generate the command signal C1* for controlling the first converter 33 and command signal C2* for controlling the second converter 34. The first control apparatus 37 is configured to control the first converter 33 (especially, the upper arm element 331 and the lower arm element 332) on the basis of the command signal C1* that is generated by the first control apparatus 37 itself. The first control apparatus 37 is configured to transmit the command signal C2* that is generated by the first control apparatus 37 itself to the second control apparatus 38 through a wired or wireless communication line 39 that connects the first control apparatus 37 and the second control apparatus 38.

The second control apparatus 38 is configured to receive the command signal C2* transmitted from the first control apparatus 37. The second control apparatus 38 is configured to control the second converter 34 (especially, the upper arm element 341 and the lower arm element 342) on the basis of the received command signal C2*.

In the present embodiment, the first converter 37 is configured to control the first converter 33 so that the state of the first converter 33 is changed between a boosting state that is one example of the "first state" and an upper arm ON state that is one example of the "second state". The second converter 38 is also configured to control the second converter 34 so that the state of the second converter 34 is changed between the boosting state and the upper arm ON state.

The boosting state includes a state in which the upper arm element 331 and the lower arm element 332 are alternately switched (namely, turned on and then turned off repeatedly) in a complementary manner and a state in which the upper arm element 341 and the lower arm element 342 are alternately switched in a complementary manner. Each of the first converter 33 and the second converter 34 in the boosting state is capable of boost the electrical voltage of the electrical power that is outputted from the electrical power source 31 and is capable of stepping down the electrical voltage of the electrical power that is outputted from the motor generator 10.

The upper arm ON state includes a state in which the upper arm element 331 keeps being in the ON state and the lower arm element 332 keeps being in the OFF state and a state in which the upper arm element 341 keeps being in the ON state and the lower arm element 342 keeps being in the OFF state. Each of the upper arm element 331 and the lower arm element 332 is not switched in the first converter 33 in the upper arm ON state, and thus, the switching loss is reduced. On the other hand, although the first converter 33 in the upper arm ON state is not capable of boosting or stepping down the electrical voltage, the electrical power source 31 is electrically connected to the motor generator 10 through the upper arm element 331. Same is true in the second converter 34 in the upper arm ON state.

(2) Flow of Operation for Controlling First Converter 33 and Second Converter 34

In the present embodiment, the first converter 33 and the second converter 34 are usually controlled so that the state of the first converter 33 is same as the state of the second converter 34. Namely, the first converter 33 and the second converter 34 are usually controlled so that the second converter 34 is in the boosting state when the first converter 33 is in the boosting state and the second converter 34 is in the upper arm ON state when the first converter 33 is in the upper arm ON state. However, when state of each of the first converter 33 and the second converter 34 is changed from the boosting state to the upper arm ON state or from the upper arm ON state to the boosting state, the first converter 33 and the second converter 34 are usually controlled so that the state of the first converter 33 is allowed to be temporally different from the state of the second converter 34, as an exceptional case. In the following description, with reference to FIG. 2 to FIG. 4, an operation for controlling the first converter 33 and the second converter 34 will be described in detail.

(2-1) Entire Flow of Operation for Controlling First Converter 33 and Second Converter 34

Firstly, with reference to a flowchart illustrated in FIG. 2, an entire flow of the operation for controlling the first converter 33 and the second converter 34 will be described.

As illustrated in FIG. 2, the first control apparatus 37 calculates a required value of the system voltage VH (a step S101). For example, the first control apparatus 37 calculates a required torque of the motor generator 10 on the basis of an operational amount of an accelerator pedal by a user, an operational amount of a brake pedal by the user, a speed of the vehicle 1 and the like, and then calculates, as the required value, a value of the system voltage VH that is required for the motor generator 10 to output the calculated required torque. Note that the required torque is a positive torque (namely, a torque that accelerates the vehicle 1) when the vehicle 1 is in the power running state and the required torque is a negative torque (namely, a torque that decelerates the vehicle 1) when the vehicle 1 is in the regeneration state, typically.

Then, the first control apparatus 37 determines whether or not both of the first converter 33 and the second converter 34 are in the boosting state (a step S102).

As a result of the determination at the step S102, if it is determined that both of the first converter 33 and the second converter 34 are in the boosting state (the step S102: Yes), the first control apparatus 37 determines whether or not it is necessary to change the state of each of the first converter 33 and the second converter 34 from the boosting state to the upper arm ON state, on the basis of the required value of the system voltage VH calculated at the step S101 (a step S103). Specifically, if the required value of the system voltage VH is higher than the voltage outputted from the electrical power source 31 (hereinafter, this voltage is referred to as a "source voltage VL"), the first control apparatus 37 determines that it is not necessary to change the state of each of the first converter 33 and the second converter 34 from the boosting state to the upper arm ON state. On the other hand, if the required value of the system voltage VH is equal to the source voltage VL, the first control apparatus 37 determines that it is necessary to change the state of each of the first converter 33 and the second converter 34 from the boosting state to the upper arm ON state.

As a result of the determination at the step S103, if it is determined that it is not necessary to change the state of each of the first converter 33 and the second converter 34 from the boosting state to the upper arm ON state (the step S103: No), the first control apparatus 37 generates the command signal C1* for allowing the first converter 33 to be in the boosting state (namely, for keeping the first converter 33 to be in the boosting state) (a step S105). Moreover, the first control apparatus 37 generates the command signal C2* for allowing the second converter 34 to be in the boosting state (namely, for keeping the second converter 34 to be in the boosting state) (the step S105).

Then, the first control apparatus 37 controls the first converter 33 on the basis of the command signal C1* generated at the step S105 (a step S107). Moreover, the first control apparatus 37 transmits, to the second control apparatus 38, the command signal C2* generated at the step S105 (the step S107). The second control apparatus 38 receives the command signal C2* transmitted from the first control apparatus 37 and controls the second converter 34 on the basis of the received command signal C2* (a step S201). As a result, both of the first converter 33 and the second converter 34 keep being in the boosting state so that the system voltage VH agree with a target value VH* of the system voltage VH (hereinafter, this target value VH* is referred to as a "target voltage VH*"). Note that the target voltage VH* is set by the first control apparatus 37 so that the target voltage VH* agrees with the required value of the system voltage VH.

On the other hand, as a result of the determination at the step S103, if it is determined that it is necessary to change the state of each of the first converter 33 and the second converter 34 from the boosting state to the upper arm ON state (the step S103: Yes), the first control apparatus 37 and the second control apparatus 38 perform a below-described operation illustrated in FIG. 3 to change the state of each of the first converter 33 and the second converter 34 from the boosting state to the upper arm ON state.

On the other hand, as a result of the determination at the step S102, if it is determined that both of the first converter 33 and the second converter 34 are not in the boosting state (the step S102: No), both of the first converter 33 and the second converter 34 are supposed to be in the upper arm ON state. In this case, the first control apparatus 37 determines whether or not it is necessary to change the state of each of the first converter 33 and the second converter 34 from the upper arm ON state to the boosting state, on the basis of the required value of the system voltage VH that has been calculated at the step S101 (a step S104). Specifically, if the required value of the system voltage VH is equal to the source voltage VL, the first control apparatus 37 determines that it is not necessary to change the state of each of the first converter 33 and the second converter 34 from the upper arm ON state to the boosting state. On the other hand, if the required value of the system voltage VH is higher than the source voltage VL, the first control apparatus 37 determines that it is necessary to change the state of each of the first converter 33 and the second converter 34 from the upper arm ON state to the boosting state.

As a result of the determination at the step S104, if it is determined that it is not necessary to change the state of each of the first converter 33 and the second converter 34 from the upper arm ON state to the boosting state (the step S104: No), the first control apparatus 37 generates the command signal C1* for keeping the first converter 33 to be in the upper arm ON state and the command signal C2* for keeping the second converter 34 to be in the upper arm ON state (a step S106).

Then, the first control apparatus 37 controls the first converter 33 on the basis of the command signal C1* generated at the step S106 (the step S107). Moreover, the second control apparatus 38 controls the second converter 34 on the basis of the command signal C2* received from the first control apparatus 37 (the step S201). As a result, both of the first converter 33 and the second converter 34 keep being in the upper arm ON state so that the system voltage VH agree with the target voltage VH* (in this case, the target voltage VH* (i.e. the required value of the system voltage VH) is equal to the source voltage VL).

On the other hand, as a result of the determination at the step S104, if it is determined that it is necessary to change the state of each of the first converter 33 and the second converter 34 from the upper arm ON state to the boosting state (the step S104: Yes), the first control apparatus 37 and the second control apparatus 38 perform a below-described operation illustrated in FIG. 4 to change the state of each of the first converter 33 and the second converter 34 from the upper arm ON state to the boosting state.

(2-2) Flow of Operation for Changing State of Each of First Converter 33 and Second Converter 34 from Boosting State to Upper Arm ON State Next, with reference to a flowchart illustrated in FIG. 3, an operation for changing the state of each of the first converter 33 and the second converter 34 from the boosting state to the upper arm ON state will be described.

In the present embodiment, the first control apparatus 37 performs the operation illustrated in FIG. 3 instead of generating the command signal C1* and C2* for simultaneously changing the state of each of the first converter 33 and the second converter 34 to the upper arm ON state. The reason is as follows. Since the command signal C2* is transmitted from the first control apparatus 37 to the second control apparatus 38, a timing at which the second control apparatus 38 starts to control the second converter 33 on the basis of the command signal C2* generated by the first control apparatus 37 at a predetermined time is delayed with respect to a timing at which the first control apparatus 37 starts to control the first converter 34 on the basis of the command signal C1* generated by the first control apparatus 37 at the same predetermined time. This is because a delay time $\Delta T$ occurs when the second control apparatus 38 controls the second converter 34 on the basis of the command signal C2*, wherein the delay time $\Delta T$ includes a time that is required for the first control apparatus 37 to transmit, to the second control apparatus 38, the command signal C2* generated by the first control apparatus 37 and a time that is required for the second control apparatus 38 to receive the transmitted command signal C2* and then to actually start to control the second converter 34 on the basis of the received command signal C2*. Thus, if the command signals C1* and C2* for simultaneously changing the state of each of the first converter 33 and the second converter 34 to the upper arm ON state are generated without considering the delay time $\Delta T$, a timing at which the state of the second converter 34 is changed to the upper arm ON state is delayed by the delay time $\Delta T$ with respect to a timing at which the state of the first converter 33 is changed to the upper arm ON state. In this case, there is a possibility that undesired large electrical current flows from the second converter 34 in the boosting state to the first converter 33 in the upper arm ON state. Thus, in the present embodiment, the operation illustrated in FIG. 3 is performed in order to prevent the undesired large electrical current from flowing.

Specifically, as illustrated in FIG. 3, the first control apparatus 37 generates the command signal C1* for keeping the first converter 33 to be in the boosting state (a step S111). Moreover, the first control apparatus 37 generates the command signal C2* for changing the state of the second converter 34 from the boosting state to an upper/lower arm OFF state and then keeping the second converter 34 to be in the upper/lower arm OFF state (the step S111). The upper/lower arm OFF state is a state in which both of the upper arm element 341 and the lower arm element 342 keep being in the OFF state (namely, the second converter 34 is shut down). Note that the upper/lower arm OFF state is one example of the "third state".

Then, the first control apparatus 37 controls the first converter 33 on the basis of the command signal C1* generated at the step S111 (a step S112). As a result, the first converter 33 keeps being in the boosting state. Moreover, the second control apparatus 38 controls the second converter 34 on the basis of the command signal C2* received from the first control apparatus 37 (a step S211). As a result, the state of the second converter 34 is changed from the boosting state to the upper/lower arm OFF state and then the second converter 34 keeps being in the upper/lower arm OFF state.

During a period when the first converter 33 and the second converter 34 are controlled on the basis of the command signals C1* and C2*, respectively, generated at the step S111, the first control apparatus 37 determines whether or not a predetermined time T1 that is one example of the "first predetermined time" has elapsed after starting the control based on the command signals C1* and C2* generated at the step S111 (a step S113). Namely, the first control apparatus 37 determines whether or not the predetermined time T1 has elapsed after generating the command signal C2* for starting to change the state of the second converter 34 to the upper/lower arm OFF state (the step S113). Note that the predetermined time T1 is set to be any value that is equal to or larger than the delay time $\Delta T$.

As a result of the determination at the step S113, if it is determined that the predetermined time T1 has not yet elapsed (the step S113: No), the second converter 34 is supposed not to be in the upper/lower arm OFF state yet (namely, is supposed to be still in the boosting state). This is because there is a possibility that the command signal C2* for starting the change of the state of the second converter 34 to the upper/lower arm OFF state is not yet used (for example, not yet received) by the second control apparatus 38 for controlling the second converter 34 due to the delay time $\Delta T$. In this case, the first control apparatus 37 keeps determining whether or not the predetermined time T1 has elapsed while controlling the first converter 33 and the second converter 34 on the basis of the command signals C1* and C2*, respectively, generated at the step S111.

On the other hand, as a result of the determination at the step S113, if it is determined that the predetermined time T1 has elapsed (the step S113: Yes), the state of the second converter 34 is supposed to have been already changed to the upper/lower arm OFF state. In this case, the first control apparatus 37 generates the command signal C1* for changing the state of the first converter 33 from the boosting state to the upper arm ON state and then keeping the first converter 33 to be in the upper arm ON state (a step S121). Moreover, the first control apparatus 37 generates the command signal C2* for keeping the second converter 34 to be in the upper/lower arm OFF state (the step S121).

Then, the first control apparatus 37 controls the first converter 33 on the basis of the command signal C1* generated at the step S121 (a step S122). As a result, the state of the first converter 33 is changed from the boosting state to the upper arm ON state and then the first converter 33 keeps being in the upper arm ON state. Moreover, the second control apparatus 38 controls the second converter 34 on the basis of the command signal C2* received from the first control apparatus 37 (a step S221). As a result, the second converter 34 keeps being in the upper/lower arm OFF state.

After the state of the first converter 33 has been changed to the upper arm ON state, the first control apparatus 37 generates the command signal C1* for keeping the first converter 33 to be in the upper arm ON state (a step S131). Moreover, the first control apparatus 37 generates the command signal C2* for changing the state of the second converter 34 from the upper/lower arm OFF state to the upper arm ON state and then keeping the second converter 34 to be in the upper arm ON state (the step S131).

Then, the first control apparatus 37 controls the first converter 33 on the basis of the command signal C1* generated at the step S131 (a step S132). As a result, the first converter 33 keeps being in the upper arm ON state.

Moreover, the second control apparatus 38 controls the second converter 34 on the basis of the command signal C2* received from the first control apparatus 37 (a step S231). As a result, the state of the second converter 34 is changed from the upper/lower arm OFF state to the upper arm ON state and then the second converter 34 keeps being in the upper arm ON state.

(2-3) Flow of Operation for Changing State of Each of First Converter 33 and Second Converter 34 from Upper Arm ON State to Boosting State Next, with reference to a flowchart illustrated in FIG. 4, an operation for changing the state of each of the first converter 33 and the second converter 34 from the upper arm ON state to the boosting state will be described.

In the present embodiment, the first control apparatus 37 performs the operation illustrated in FIG. 4 instead of generating the command signal C1* and C2* for simultaneously changing the state of each of the first converter 33 and the second converter 34 to the boosting state. The purpose is to prevent the undesired large electrical current from flowing from the first converter 33 in the boosting state to the second converter 34 in the upper arm ON state, wherein the undesired large electrical current is caused by a timing at which the state of the second converter 34 is changed to the boosting state being delayed by the delay time ΔT with respect to a timing at which the state of the first converter 33 is changed to the boosting state, as described above.

Specifically, as illustrated in FIG. 4, the first control apparatus 37 generates the command signal C1* for keeping the first converter 33 to be in the upper arm ON state (a step S141). Moreover, the first control apparatus 37 generates the command signal C2* for changing the state of the second converter 34 from the upper arm ON state to the upper/lower arm OFF state and then keeping the second converter 34 to be in the upper/lower arm OFF state (the step S141). Then, the first control apparatus 37 controls the first converter 33 on the basis of the command signal C1* generated at the step S141 (a step S142). As a result, the first converter 33 keeps being in the upper arm ON state. Moreover, the second control apparatus 38 controls the second converter 34 on the basis of the command signal C2* received from the first control apparatus 37 (a step S241). As a result, the state of the second converter 34 is changed from the upper arm ON state to the upper/lower arm OFF state and then the second converter 34 keeps being in the upper/lower arm OFF state.

During a period when the first converter 33 and the second converter 34 are controlled on the basis of the command signals C1* and C2*, respectively, generated at the step S141, the first control apparatus 37 determines whether or not the predetermined time T1 has elapsed after starting the control based on the command signals C1* and C2* generated at the step S141 (a step S143). Namely, the first control apparatus 37 determines whether or not the predetermined time T1 has elapsed after generating the command signal C2* for starting to change the state of the second converter 34 to the upper/lower arm OFF state (the step S143).

As a result of the determination at the step S143, if it is determined that the predetermined time T1 has not yet elapsed (the step S143: No), the second converter 34 is supposed not to be in the upper/lower arm OFF state yet (namely, is supposed to be still in the upper arm ON state). In this case, the first control apparatus 37 keeps determining whether or not the predetermined time T1 has elapsed while controlling the first converter 33 and the second converter 34 on the basis of the command signals C1* and C2*, respectively, generated at the step S141.

On the other hand, as a result of the determination at the step S143, if it is determined that the predetermined time T1 has elapsed (the step S143: Yes), the state of the second converter 34 is supposed to have been already changed to the upper/lower arm OFF state. In this case, the first control apparatus 37 generates the command signal C1* for changing the state of the first converter 33 from the upper arm ON state to the boosting state and then keeping the first converter 33 to be in the boosting state (a step S151). Moreover, the first control apparatus 37 generates the command signal C2* for keeping the second converter 34 to be in the upper/lower arm OFF state (the step S151). Then, the first control apparatus 37 controls the first converter 33 on the basis of the command signal C1* generated at the step S151 (a step S152). As a result, the state of the first converter 33 is changed from the upper arm ON state to the boosting state and then the first converter 33 keeps being in the boosting state. Moreover, the second control apparatus 38 controls the second converter 34 on the basis of the command signal C2* received from the first control apparatus 37 (a step S251). As a result, the second converter 34 keeps being in the upper/lower arm OFF state.

After the state of the first converter 33 has been changed to the boosting state, the first control apparatus 37 generates the command signal C1* for keeping the first converter 33 to be in the boosting state (a step S161). Moreover, the first control apparatus 37 generates the command signal C2* for changing the state of the second converter 34 from the upper/lower arm OFF state to the boosting state and then keeping the second converter 34 to be in the boosting state (the step S161). Then, the first control apparatus 37 controls the first converter 33 on the basis of the command signal C1* generated at the step S161 (a step S162). As a result, the first converter 33 keeps being in the boosting state. Moreover, the second control apparatus 38 controls the second converter 34 on the basis of the command signal C2* received from the first control apparatus 37 (a step S261). As a result, the state of the second converter 34 is changed from the upper/lower arm OFF state to the boosting state and then the second converter 34 keeps being in the boosting state.

(3) Description of Technical Effect

Next, a technical effect of the electrical power system 30 in the present embodiment will be described. In the following description, firstly, with reference to FIG. 5 and FIG. 6, a technical problem occurred in an electrical power system in a comparison example will be described. The electrical power system in the comparison example is configured to generate the command signals C1* and C2* for simultaneously changing the state of each of the first converter 33 and the second converter 34 to the upper arm ON state or the boosting state. Then, with reference to FIG. 7 and FIG. 8, technical effect of the electrical power system 30 in the present embodiment will be described. Note that FIG. 5 to FIG. 8 illustrate an example in which each of the first converter 33 and the second converter 34 boosts the electrical voltage outputted from the electrical power source 31, for the purpose of simple illustration.

(3-1) Technical Problem Occurred in Electrical Power System in Comparison Example FIG. 5 is a timing chart that illustrates temporal transition of the state of the electrical power system in the comparison example, when the electrical power system in the comparison example changes the state of each of the first converter 33 and the second converter 34 from the boosting state to the upper arm ON state. The state of the electrical power system includes the required value of the system voltage VH, the command signals C1* and C2*, the state of each of the first converter 33 and the second converter 34, the target voltage VH*, the system voltage VH, a converter current IL1 flowing through the first converter 33 and a converter current IL2 flowing through the second converter 34.

As illustrated by a first graph in FIG. 5, the required value of the system voltage VH, which is higher than the source voltage VL before a time t51, decreases to be equal to the source voltage VL at the time t51. In this case, as illustrated by a second graph and a third graph in FIG. 5, the command signal C1* for changing the state of the first converter 33 from the boosting state to the upper arm ON state and the command signal C2* for changing the state of the second converter 34 from the boosting state to the upper arm ON state are generated at the time t51. As a result, as illustrated by a fifth graph in FIG. 5, the state of the first converter 33 is changed from the boosting state to the upper arm ON state at the time t51. On the other hand, since the above described delay time ΔT occurs, as illustrated by a fourth graph in FIG. 5, the command signal C2* generated at the time t51 is received by the second control apparatus 38 at a time t52 that is delayed by the delay time ΔT with respect to the time t51. As a result, as illustrated by a sixth graph in FIG. 5, the state of the second converter 34 is changed from the boosting state to the upper arm ON state at the time t52. Therefore, in a first time period from the time t51 to the time t52, the second converter 34 is in the boosting state although the first converter 33 is in the upper arm ON state. Thus, as illustrated by a seventh graph in FIG. 5, in the first time period, although the target voltage VH* is set to be the source voltage VL, the second converter 34 keeps boosting the electrical voltage outputted from the electrical power source 31 on the basis of the previous target voltage VH* (namely, the previous target voltage VH* higher than the source voltage VL). On the other hand, as illustrated by an eighth graph in FIG. 5, the system voltage VH decreases to be equal to the source voltage VL in the first time period, because the first converter 33 is in the upper arm ON state in the first time period. Thus, as illustrated by a tenth graph in FIG. 5, the second converter 34 tries to boost the electrical voltage outputted to the motor generator 10 by allowing the relatively large converter current IL2 to flow in the first time period. However, as illustrated by a ninth graph in FIG. 5, at least one portion of the converter current IL2 returns to the first converter 33 that does not boost the electrical voltage outputted from the electrical power source 31 and thus does not allow the relatively large converter current IL1 to flow. As a result, the relatively large electrical current (specifically, the electrical current that is large enough to deteriorate resistance of the first converter 33 and the second converter 34 with respect to heat) flows through both of the first converter 33 and the second converter 34.

Next, FIG. 6 is a timing chart that illustrates temporal transition of the state of the electrical power system in the comparison example, when the electrical power system in the comparison example changes the state of each of the first converter 33 and the second converter 34 from the upper arm ON state to the boosting state. As illustrated by a first graph in FIG. 6, the required value of the system voltage VH, which is equal to the source voltage VL before a time t61, increases to be higher than the source voltage VL at the time t61. In this case, as illustrated by a second graph and a third graph in FIG. 6, the command signal C1* for changing the state of the first converter 33 from the upper arm ON state to the boosting state and the command signal C2* for changing the state of the second converter 34 from the upper arm ON state to the boosting state are generated at the time t61. As a result, as illustrated by a fifth graph in FIG. 6, the state of the first converter 33 is changed from the upper arm ON state to the boosting state at the time t61. On the other hand, since the above described delay time ΔT occurs, as illustrated by a sixth graph in FIG. 6, the state of the second converter 34 is changed from the upper arm ON state to the boosting state at a time t62 that is delayed by the delay time ΔT with respect to the time t61. Therefore, in a second time period from the time t61 to the time t62, the second converter 34 is in the upper arm ON state although the first converter 33 is in the boosting state. Thus, in the second time period, although the target voltage VH* is set to be the required value of the system voltage VH higher than the source voltage VL as illustrated by a seventh graph in FIG. 6, the system voltage VH does not increases and keeps being equal to the source voltage VL as illustrated by a eighth graph in FIG. 6, because the second converter 34 is in the upper arm ON state. Thus, as illustrated by a ninth graph in FIG. 6, the first converter 33 tries to boost the electrical voltage outputted to the motor generator 10 by allowing the relatively large converter current IL1 to flow in the second time period. However, as illustrated by a tenth graph in FIG. 6, at least one portion of the converter current IL1 returns to the second converter 34 that does not boost the electrical voltage outputted from the electrical power source 31 and thus does not allow the relatively large converter current IL2 to flow. As a result, the relatively large electrical current flows through both of the first converter 33 and the second converter 34.

(3-2) Technical Effect of Electrical Power System 30 in Present Embodiment

Next, FIG. 7 is a timing chart that illustrates temporal transition of the state of the electrical power system 30 in the present embodiment, when the electrical power system 30 in the present embodiment changes the state of each of the first converter 33 and the second converter 34 from the boosting state to the upper arm ON state. As illustrated by a first graph in FIG. 7, the required value of the system voltage VH, which is higher than the source voltage VL before a time t71, decreases to be equal to the source voltage VL at the time t71. In this case, as illustrated by a second graph and a third graph in FIG. 7, the command signal C1* for keeping the state of the first converter 33 to be in the boosting state and the command signal C2* for changing the state of the second converter 34 from the boosting state to the upper/lower arm OFF state are generated at the time t71. As a result, as illustrated by a fifth graph in FIG. 7, the first converter 33 keeps being in the boosting state after the time t71. Moreover, as illustrated in a sixth graph in FIG. 7, the state of the second converter 34 is changed from the boosting state to the upper/lower arm OFF state at a time t72 that is delayed by the delay time ΔT with respect to the time t71. As a result, as illustrated by a tenth graph in FIG. 7, the converter current IL2 is zero after the time t72. Then, it is determined at a time t73 that the predetermined time T1 has elapsed after the time t71 at which the command signal C2* for changing the state of the second converter 34 to the upper/lower arm OFF state is generated. Therefore, as illustrated by the second graph in FIG. 7, the command signal C1* for changing the state of the first converter 33 from the boosting state to the upper arm ON state is generated at the time t73. Moreover, as illustrated by a seventh graph in FIG. 7, the target voltage VH*, which is set to be a value higher than the source voltage VL before the time t73, decreases to be equal to the source voltage VL at the time t73. As a result, as illustrated by the fifth graph in FIG. 7, the state of the first converter 33 is changed from the boosting state to the upper arm ON state at the time t73. As a result, as illustrated by an eighth graph in FIG. 7, the system voltage VH, which is higher than the source voltage VL before the time t73, decreases to be equal to the source voltage VL after the time t73. Then, the command signal C2* for changing the state of the second converter 34 from the upper/lower arm OFF state to the upper arm ON state is generated at a time t74 after the time t73. As a result, as illustrated by the sixth graph in FIG. 7, the state of the second converter 34 is changed from the upper/lower arm OFF state to the upper arm ON state at a time t75 that is delayed by the delay time ΔT with respect to the time t74. Thus, the above described first time period in which the second converter 34 is in the boosting state although the first converter 33 is in the upper arm ON state does not exist in the electrical power system 30 in the present embodiment.

Next, FIG. 8 is a timing chart that illustrates temporal transition of the state of the electrical power system 30 in the present embodiment, when the electrical power system 30 in the present embodiment changes the state of each of the first converter 33 and the second converter 34 from the upper arm ON state to the boosting state. As illustrated by a first graph in FIG. 8, the required value of the system voltage VH, which is equal to the source voltage VL before a time t81, increases to be higher than the source voltage VL at the time t81. In this case, as illustrated by a second graph and a third graph in FIG. 8, the command signal C1* for keeping the state of the first converter 33 to be in the upper arm ON state and the command signal C2* for changing the state of the second converter 34 from the upper arm ON state to the upper/lower arm OFF state are generated at the time t81. As a result, as illustrated by a fifth graph in FIG. 7, the first converter 33 keeps being in the upper arm ON state after the time t81. Moreover, as illustrated in a sixth graph in FIG. 8, the state of the second converter 34 is changed from the upper arm ON state to the upper/lower arm OFF state at a time t82 that is delayed by the delay time ΔT with respect to the time t81. As a result, as illustrated by a tenth graph in FIG. 8, the converter current IL2 is zero after the time t82. Then, it is determined at a time t83 that the predetermined time T1 has elapsed after the time t81 at which the command signal C2* for changing the state of the second converter 34 to the upper/lower arm OFF state is generated. Therefore, as illustrated by the second graph in FIG. 8, the command signal C1* for changing the state of the first converter 33 from the upper arm ON state to the boosting state is generated at the time t83. Moreover, as illustrated by a seventh graph in FIG. 8, the target voltage VH*, which is equal to the source voltage VL before the time t83, increases to be equal to the required value of the system voltage VH at the time t83. As a result, as illustrated by the fifth graph in FIG. 8, the state of the first converter 33 is changed from the upper arm ON state to the boosting state at the time t83. As a result, as illustrated by an eighth graph in FIG. 8, the system voltage VH, which is equal to the source voltage VL before the time t83, increases to be equal to the required value of the system voltage VH after the time t83. Then, the command signal C2* for changing the state of the second converter 34 from the upper/lower arm OFF state to the boosting state is generated at a time t84 after the time t83. As a result, as illustrated by the sixth graph in FIG. 8, the state of the second converter 34 is changed from the upper/lower arm OFF state to the boosting state at a time t85 that is delayed by the delay time ΔT with respect to the time t84. Thus, the above described second time period in which the second converter 34 is in the upper arm ON state although the first converter 33 is in the boosting state does not exist in the electrical power system 30 in the present embodiment.

As described above, one of the first converter 33 and the second converter 34 is not in the upper arm ON state when the other one of the first converter 33 and the second converter 34 is in the boosting state in the electrical power system in the present embodiment. Thus, relatively large electrical currents IL1 and IL2 do not flow through the first converter 33 and the second converter 34, respectively, when the state of each of the first converter 33 and the second converter 34 is changed from the boosting state to the upper arm ON state or from the upper arm ON state to the boosting state. Therefore, it is possible to appropriately suppress the deterioration of the resistance of the first converter 33 and the second converter 34 with respect to the heat (4) Modified Example In the above described example, as illustrated in FIG. 7 and FIG. 8, the first control apparatus 37 generates the command signal C2* for changing the state of the second converter 34 from the upper/lower arm OFF state to the upper arm ON state or the boosting state after generating the command signal C1* for changing the state of the first converter 33 from the boosting state to the upper arm ON state or from the upper arm ON state to the boosting state. However, as illustrated in FIG. 9, the first control apparatus 37 may generate the command signal C2* for changing the state of the second converter 34 from the upper/lower arm OFF state to the upper arm ON state or the boosting state before generating the command signal C1* for changing the state of the first converter 33 from the boosting state to the upper arm ON state or from the upper arm ON state to the boosting state. FIG. 9 illustrates an example in which the first control apparatus 37 generates the command signal C2* for changing the state of the second converter 34 from the upper/lower arm OFF state to the upper arm ON state or the boosting state a time t93 before a time t94. Even in this case, as long as the state of the second converter 34 is changed from the upper/lower arm OFF state to the upper arm ON state or the boosting state after the state of the first converter 33 is changed from the boosting state to the upper arm ON state or from the upper arm ON state to the boosting state, the above described technical effect can be achieved.

Specifically, the first control apparatus 37 may generate the command signal C2* for changing the state of the second converter 34 from the upper/lower arm OFF state to the upper arm ON state or the boosting state after a predetermined time T2 has elapsed from a time point at which the command signal C2* for starting to change the state of the second converter 34 to the upper/lower arm OFF state is generated. Note that the predetermined time T2 is one example of the "second predetermined time". FIG. 9 illustrates an example in which the first control apparatus 37 generates the command signal C2* for changing the state of the second converter 34 from the upper/lower arm OFF state to the upper arm ON state or the boosting state at the time t93 at which the predetermined time T2 has elapsed from a time t91. In this case, the predetermined time T2 is set to be any time longer than a difference between the predetermined time T1 and the delay time ΔT (namely, predetermined time T1−delay time ΔT). When the predetermined time T2 is set in this manner, the state of the second converter 34 is changed from the upper/lower arm OFF state to the upper arm ON state or the boosting state after the state of the first converter 33 is changed from the boosting state to the upper arm ON state or from the upper arm ON state to the boosting state. FIG. 9 illustrates an example in which the state of the second converter 34 is changed from the upper/lower arm OFF state to the upper arm ON state or the boosting state at a time t95 that is delayed by the delay time ΔT with respect to the time t93. In this case, the time t95 is after a time t94 at which the state of the first converter 33 is changed from the upper arm ON state to the boosting state. This is because a time period (=T2+ΔT>T1−ΔT+ΔT=T1) from the time t91 to the time t95 is longer than a time period (=T1) from the t91 to the time t94.

At least one portion of the structure of the vehicle 1 (for example, at least one portion of the structure of at least one of the first control apparatus 37 and the second control apparatus 38) in the present embodiment can be eliminated or modified accordingly. At least one portion of the operation that is performed by at least one of the first control apparatus 37 and the second control apparatus 38 in the present embodiment can be eliminated or modified accordingly. The order of the processes in the operation that is performed by at least one of the first control apparatus 37 and the second control apparatus 38 can be changed accordingly.

This application is based upon and claims the benefit of priority of the prior Japanese Patent Application No. 2016-241127, filed on Dec. 13, 2016, the entire contents of which are incorporated herein by reference. In addition, the entire contents of the above described Patent Literatures 1 and 2 is incorporated herein by reference.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention. An electrical power system, which involve such changes, are also intended to be within the technical scope of the present invention.

REFERENCE SIGNS LIST 1 vehicle
10 motor generator
30 electrical power system
31 electrical power source
33 first converter
331 upper arm element
332 lower arm element
333 reactor
334, 335 diode
34 second converter
341 upper arm element
342 lower arm element
343 reactor
344, 345 diode
35 smoothing condenser
36 inverter
37 first control apparatus
38 second control apparatus
39 communication line
N1, N2 node
PL power source line
GL ground line
C1*, C2* command signal
VH system voltage
VL source voltage
VH* target voltage
ΔT delay time
T1, T2 predetermined time
IL1, IL2 converter current

The invention claimed is:

1. An electrical power system comprising:
a first converter that has an upper arm and a lower arm and that is configured to boost or step down electrical voltage outputted from one of an electrical power source and a load and then to output the boosted or stepped-down electrical voltage to the other one of the electrical power source and the load;
a second converter that has an upper arm and a lower arm and that is configured to boost or step down electrical voltage outputted from one of the electrical power source and the load and then to output the boosted or stepped-down electrical voltage to the other one of the electrical power source and the load;
a first control apparatus that is configured to generate a first command signal and a second command signal, to control the upper arm and the lower arm of the first converter on the basis of the first command signal, and to transmit the second command signal to a second control apparatus through a communication line; and
the second control apparatus that is configured to receive the second command signal transmitted from the first control apparatus, and to control the upper arm and the lower arm of the second converter on the basis of the received second command signal,
wherein
when it is requested that a state of each of the first and second converters in a first state in which the upper arm and the lower arm are switched alternately in a complementary manner is changed to a second state in which the upper arm keeps being in an ON state and the lower arm keeps being in an OFF state or it is requested that the state of each of the first and second converters in the second state is changed to the first state, the first control apparatus is configured to generate the first and second command signals so that (i) the state of the second converter is changed from the first or second state to a third state in which both of the upper arm and the lower arm keep being in the OFF state, then (ii) the state of the first converter is changed from the first state to the second state or from the second state to the first state after the state of the second converter is changed to the third state, and then (iii) the state of the second converter is changed from the third state to the second or first state after the state of the first converter is changed from the first state to the second state or from the second state to the first state.

2. The electrical power system according to claim 1, wherein
the first control apparatus is configured to generate the first command signal that requests the first converter to keep being in the first or second state until a first predetermined time elapses after generating the second command signal that requests a start of changing the state of the second converter to the third state,
the first control apparatus is configured to generate the first command signal that requests a change of state of the first converter from the first state to the second state or from the second state to the first state after the first predetermined time elapses after generating the second command signal that requests the start of changing the state of the second converter to the third state, the first predetermined time is equal to or longer than a delay time that is required for the second control apparatus to start to control the second converter on the basis of the generated second command signal after the first control apparatus generates the second command signal.

3. The electrical power system according to claim 2, wherein the first control apparatus is configured to generate the second command signal that requests the change of the state of the second converter from the third state to the second or first state after a second predetermined time elapses after generating the second command signal that requests the start of changing the state of the second converter to the third state, the second predetermined time is longer than a difference between the first predetermined time and the delay time.

* * * * *